INVENTORS
HARTLAND S. SNYDER
ROBERT F. HUMMER

BY

ATTORNEYS

United States Patent Office 3,012,148
Patented Dec. 5, 1961

3,012,148
INFRARED TRACKER
Hartland S. Snyder, Bayport, N.Y., and Robert Franklin Hummer, China Lake, Calif., assignors, by mesne assignments, to the United States of America as represented by the Secretary of the Navy
Filed July 2, 1951, Ser. No. 234,886
13 Claims. (Cl. 250—203)

The present invention relates to a radiant energy tracking apparatus and more particularly to a device for tracking thermal targets and indicating the exact direction from which the radiation comes.

The apparatus of the present invention is particularly adaptable for use in a navigation system and the device may be used for tracking celestial objects, such as stars.

The extensive application of detectors of thermal radiation has proved these devices to be of the utmost importance in the field, and perhaps the most important single application of such devices is determining the exact direction from which the radiation comes. The advent of detectors of the photoconductive type, with their high sensivity and high speed of response, has provided improved methods for directional indication.

A photoconductive cell is, by definition, a device whose resistance changes with changes in the radiant flux falling upon it. If a steady flux is falling upon the cell there is a change in the resistance of the cell as compared to its resistance in the dark. If a source of direct current potential is applied to the cell in series with a suitable load resistance, the change in resistance with impinging radiant flux can be measured with a sensitive galvanometer or a high gain direct current amplifier. Galvanometers of sufficiently high sensitivity are impractical in the field and high gain direct current amplifiers are difficult to maintain in operating condition. In addition, photoconductive cells usually have rather large changes in resistance with temperature and sometimes with exposure. This means, of course, that considerable difficulty will be encountered if such a cell is operated as a direct current device.

However, certain photoconductive cells have a rapid response to changes in radiant flux. Due to this fact, even though the original light source gives off a steady flux, the radiation falling upon the cell can be mechanically interrupted thus obtaining an alternating signal which can be amplified by a conventional alternating current amplifier. This alternating current signal can then be reconverted to a direct current indicating signal by the use of a demodulator. It is possible, by utilizing a special type of mechanical interrupter or "chopper," and a special demodulating scheme, to determine the angular direction of a source of radiation with respect to the optical axis of a receiving system. By such a system it is possible not only to determine this direction in two dimensions for a fixed position source, but to give a position-versus-time indication for a moving source in the fixed field of view of the receiver. Further, the output of the device can be used as the control voltage on a follow-up mechanism designed to drive the entire unit in such a manner that the optcial axis of the system intersects the thermal target at all times.

A prime object of the present invention is the provision of a tracking device which is sensitive to thermal radiation.

Another object is the provision of a system for producing signals responsive to deviations of a line in space from a predetermined line of sight.

Another object is the provision of means for producing output signals that are responsive to deviations of a particular line from a predetermined direction wherein the direction is established with reference to a removed source of radiant energy.

A further object is the provision of means for producing signals responsive to deviations of the optical axis of a telescope from a predetermined line in space.

A still further object is to provide a tracking apparatus employing radiation sensitive devices for detecting deviations of the apparatus from a predetermined line in space.

Yet another object is to provide a tracking apparatus which produces an error signal that may be used to drive a follow-up system.

A final object is the provision of a tracking apparatus possessing high sensitivity, high speed of response, and stability of operation while at the same time employing standard optics and only one receiving surface.

Other objects and features of the invention will become apparent to those skilled in the art as the disclosure is made in the following detailed description of a preferred embodiment of the invention as illustrated in the accompanying drawings in which.

Figure 1:
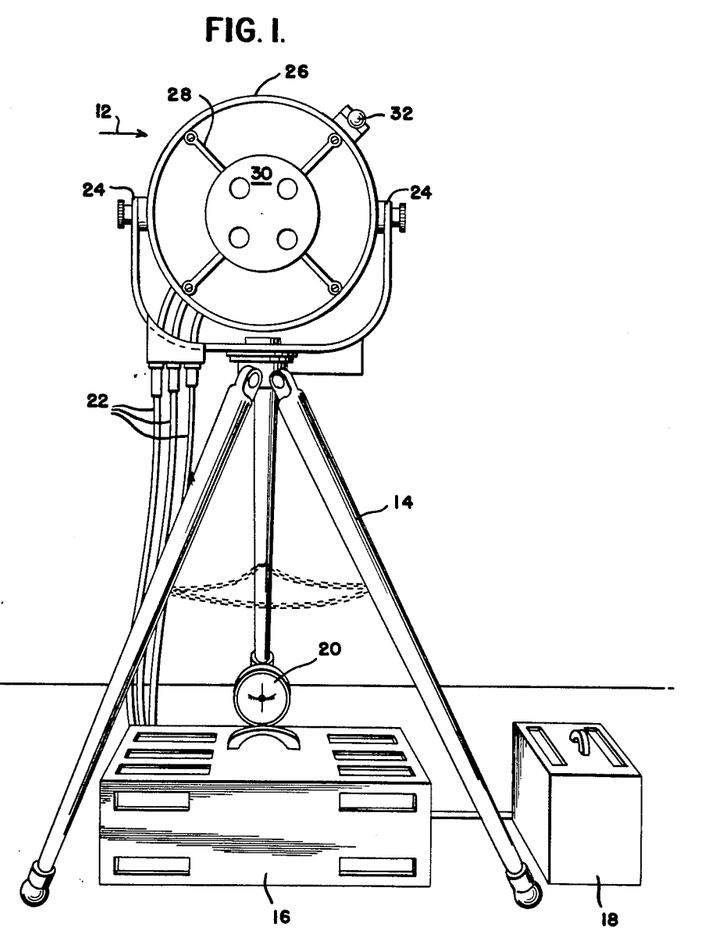
FIG. 1 shows the tracking apparatus with its associated components.

Referring now to the drawings, wherein like reference characters designate like or corresponding parts throughout the several views, there is shown in FIG. 1, which presents an overall view of the tracking apparatus and its associated components, a tracker indicated generally as 12 which may be mounted upon a tripod stand 14. Placed nearby is a small cabinet 16 which houses the amplifiers and demodulators, to be more fully described later, and also another cabinet 18 which contains the power supply to operate the apparatus. Also there can be clearly seen, in the view of FIG. 1, an indicator 20, which in this case is illustrated as a meter having dual needles, but which may take other forms as will be shown hereinafter.

The tracker 12, which is connected to amplifier 16 and power supply 18 by means of cables 22, is mounted upon pivots 24 and consists of a parabolic reflector 26 across the face of which is mounted by means of crossed supports 28, a secondary mirror 30. Placed along the outside of paraboloid 26, there may be a sighting lens 32 to aid in initially directing the apparatus toward a remote source of radiant energy.

Figures 9, 10:
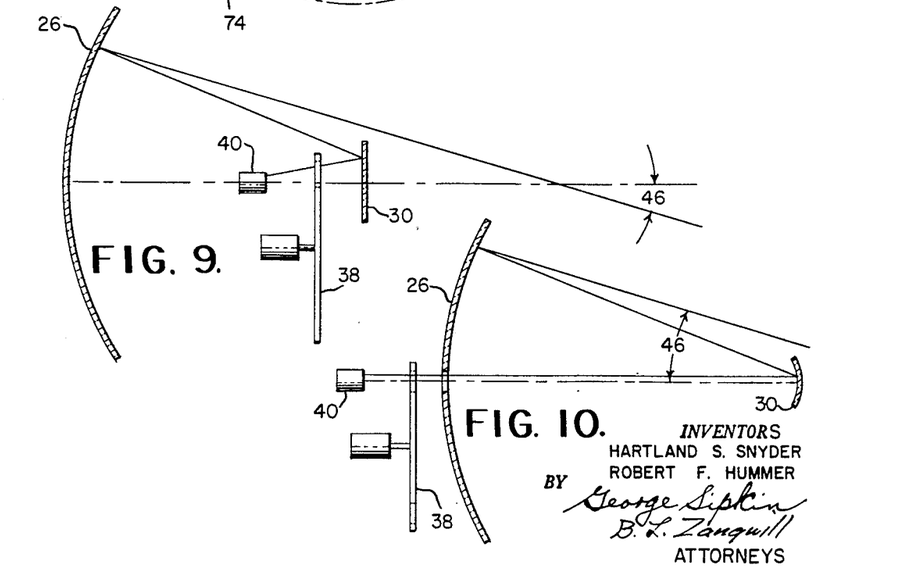
FIGURE 9 is a diagram illustrating a preferred optical system usable with the present invention.
FIGURE 10 is a diagram illustrating a modification of the optical system shown in FIGURE 9.

The optics involved in the present apparatus may comprise either of two types, depending upon the type of secondary mirror 30 employed. As illustrated in FIGURE 9, the primary reflector 26 is a 12 inch diameter precision quality paraboloid while secondary mirror 30 may be a 6 inch diameter plane mirror. The plane mirror is so positioned between the reflecting surface and focal point of the parabolic section that the final image lies 1.5 inches in front of the vertex of the paraboloid. This arrangement permits the radiation sensitive cell and chopping mechanism, shown in FIG. 2 and to be fully described hereinafter, to be placed between the two mirror surfaces thus effecting a compact system measuring only 6 inches along the axis. However, the plane mirror 30 reduces the effective light-gathering area of the main mirror 26 by some 30%, and while this arrangement is quite compact, it makes adjustment of the cells and focusing of the optics extremely difficult. Therefore an alternative optical system which may be used is a cassagram system illustrated in FIGURE 10 wherein the secondary mirror 30 is hyperbolic. From the standpoint of simplicity of design and ease of mounting, this system is more advantageous. With this system the image could be folded back through a hole in the paraboloid thus simplifying the design and mounting of the mechanism and facilitating the introduction of cooling agents such as soild $CO_2$ if the cell were of the cooled type. The effective collecting area of the main mirror 26 over the reflector using a plane mirror would be increased due to the smaller diameter hyperboloid mirror 30 necessary, but the equivalent focal length would be increased and the field of view decreased for the same size cell. Therefore the hyperboloid must be designed to give the optimum balance between the field of view and flux on the cell.

Figure 3:
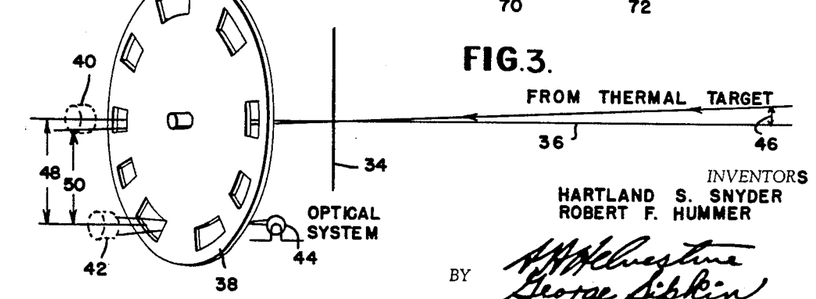
FIG. 3 is a view showing how a single detector can be used to locate a target in a horizontal plane.

In order to give an understanding of the operation of the present apparatus, attention is now directed to FIG. 3, wherein it will first be shown how a single radiation detector can be used to indicate whether a source of radiation is to the right or left in the horizontal plane of an optical line of sight. For the sake of simplicity the elements making up the optical system have been omitted from FIG. 3, and instead there is shown a focal plane 34 which represents the plane whereon distant sources are imaged by the optical system. Mounted so that its axis of rotation coincides with the optical axis 36, is a sectored disk 38 of Bakelite, or the like, whose plane parallels that of the focal plane 34 and whose openings intersect the optical axis 36 at right angles. Positioned directly behind the disk 38 and placed along the optical axis extended, is the main radiation receiving cell 40 which is an uncooled lead sufide, or similar type, cell the projected area of the sensitive layer of which is approximately ½ inch square, and preferably the same size as the openings in disk 38. From this arrangement it is clear that the revolving disk acts as a shutter to thereby break into segments any radiated energy or flux passing through the optical system and falling on cell 40. Flux falling upon this cell produces a complex signal voltage whose waveform depends upon the dimensions of the incident beam and the configuration of the chopper openings, and whose amplitude is a function of the intensity of the flux reaching the cell.

Also positioned on the same side of disk 38 as the main cell 40, and of similar type thereto, there is found another radiation sensitive cell 42, which serves to deliver a reference signal when energized by a source of constant intensity radiation such as a lamp 44, the lamp being on the same side of disk 38 as optical plane 34. In this manner the constant intensity light beam is chopped by the same sectored disk which chops the flux received from the remote source thereby producing a constant amplitude complex voltage which will be known as the phase reference voltage.

The electrical signals which leave cells 40 and 42 are modulated in waveforms having the same fundamental frequency but with a phase relation between them which depends upon the angle 46 which a distant source of radiation makes with the optical axis 36, and also upon angle 48 which is the phase angle between the output signals from cells 40 and 42 when angle 46 is zero; or in other words when the source of radiation in directly along the optical axis 36. The signals produced by cells 40 and 42 are then amplified and demodulated, resulting in a signal which is essentially a direct current whose magnitude and sign depend upon the magnitude of the signals from the cells and the phase relation between them. It is to be noted that the average value of the signal from reference cell 42 is a constant due to the unvarying flux on the cell from lamp 44. Should the position of the remote source of radiation shift from the optical axis of the tracker, then there will be produced a new phase angle 50 between the signals from cells 40 and 42. Under these conditions the demodulated, direct current signal is directly a function of the phase angle 50, and thus of angle 46, the angular position of the source with respect to the optical axis.

Figure 4:
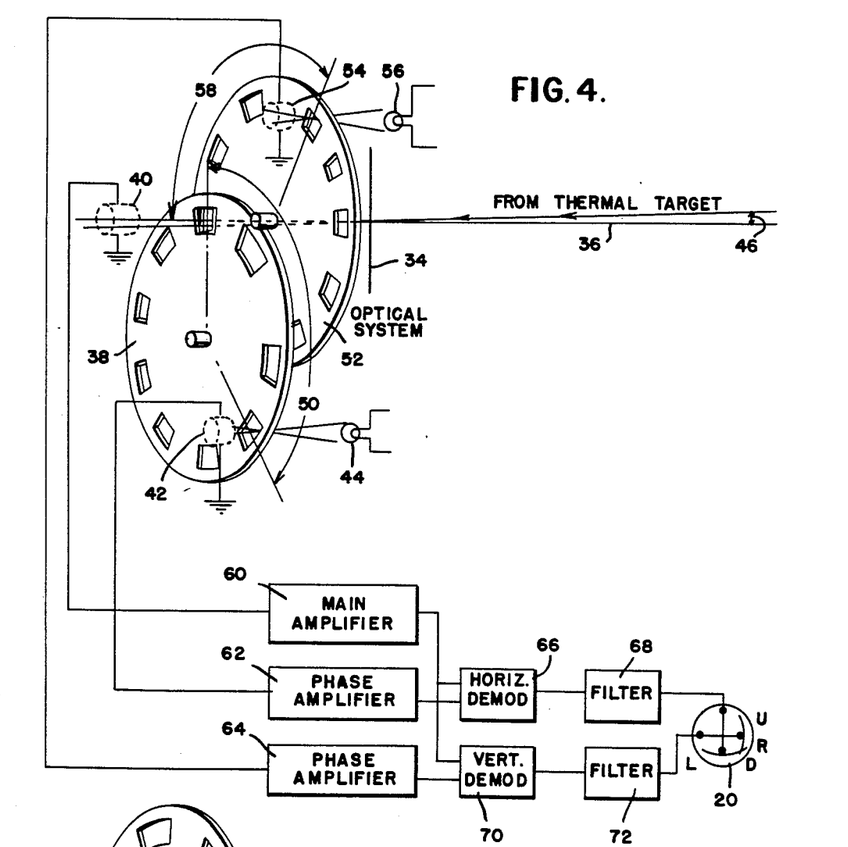
FIG. 4 shows a tracking system for locating a target in both horizontal and vertical planes.

This one-dimensional system can also be extended to give two dimensional directional sensitivity, as is illustrated in the arrangement of FIG. 4 wherein there is shown a second chopper disk 52, to obtain a vertical component, in addition to disk 38 for the horizontal component. This second chopper disk 52 is so positioned that it cuts across the face of the main cell 40 at right angles to the direction of motion of the first chopper 38, and in order that a differentiation between vertical and horizontal directions may be maintained, it is necessary that the two interruption frequencies be different, which accounts for the fact that disks 38 and 52 do not have the same number of slots cut in them. As may be clearly seen in FIG. 4 there is a reference cell 54 and an associated lamp 56 cooperating with vertical disk 52 while angle 58 determines the phase angle between the signals derived from cells 40 and 54. The electronic components which complete the tracking apparatus comprise three high gain, wide bandpass amplifiers such as 60 which is connected to main cell 40, 62 which is connected to horizontal reference cell 42, and 64 which is connected to vertical reference cell 54. To the output of amplifiers 60 and 62 there is connected a demodulator 66 which in turn feeds a low pass filter 68 the output of which is fed to indicator 20 to show any left-right deviation of the source of radiation from the optical axis of the tracker. Likewise the output of amplifiers 60 and 64 are connected to a demodulator 70 which in turn feeds another low pass filter 72 the output of which is fed to indicator 20 to show any up-down deviations.

It is to be noted here that while FIGS. 1 and 4 illustrate the use of a meter to show the amount of deviation between a remote source of radiation and the optical axis of the tracker, the novelty of the invention is not limited thereby. It is equally within the concept of the invention to have included as a portion thereof an arrangement of amplifiers and servo motors which function as a follow-up system whereby the outputs of filters 68 and 72 are utilized to energize the follow-up. In this manner the tracker can be made to follow at all times any change of position of the radiation source, as for example when the device is used to track the path of a star, or other source of radiant energy.

Figure 2:
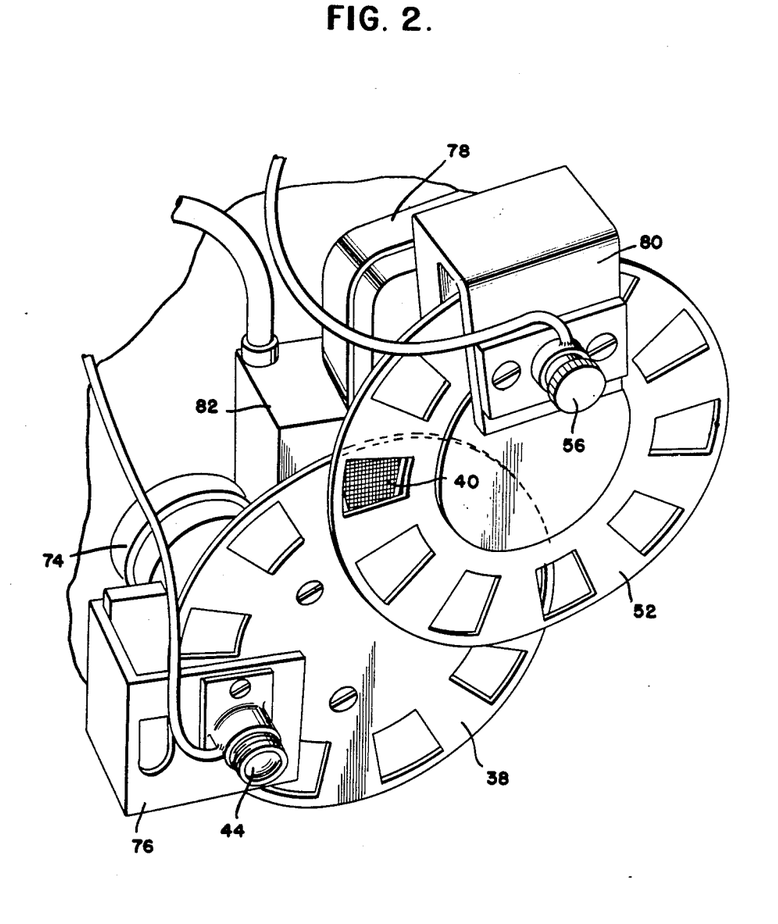
FIG. 2 is an enlarged view of the chopper disks.

Referring now to FIG. 2 there is shown an enlarged view of the chopper mechanism and it will be recalled that this element of the apparatus forms a portion of the detector 12, and is positioned either within the paraboloid 26 and just behind the secondary reflector 30, or behind the paraboloid 26 so that any received radiation will be directed to main cell 40. It can be clearly seen in FIG. 2 how the rotating disks 38 and 52 are mounted so that the cut-out sections of each disk pass in front of cell 40 at right angles to each other. It can also be seen that disk 38 is driven by a synchronous motor 74 while a U-shaped bracket 76 is used as a mounting for the reference source of radiation 44 and reference cell 42 (not shown in FIG. 2). As for disk 52, it is driven by synchronous motor 78 while reference lamp 56 and reference cell 54 are supported by U-shaped bracket 80. Both brackets 76 and 80 are so mounted that they, and therefore the lamps and cells supported thereby, can be moved peripherally along the disks until the desired phase angle, when the remote source is on the optical axis and angle 46 is zero, between the main and reference signals is obtained. Experience has shown that 90° is an advantageous angle as will be more clearly shown hereinafter. Lamps 44 and 56 may be 3 volt "grain of wheat" lamps. Placed behind the rotating disks, and housed within an enclosure 82, is the main radiation receiving cell 40 across the face of which there is put a conducting mesh (FIG. 2). Experimentation has shown that this mesh materially reduces extraneous noise and thereby improves the signal to noise ratio of the system.

Figure 8:
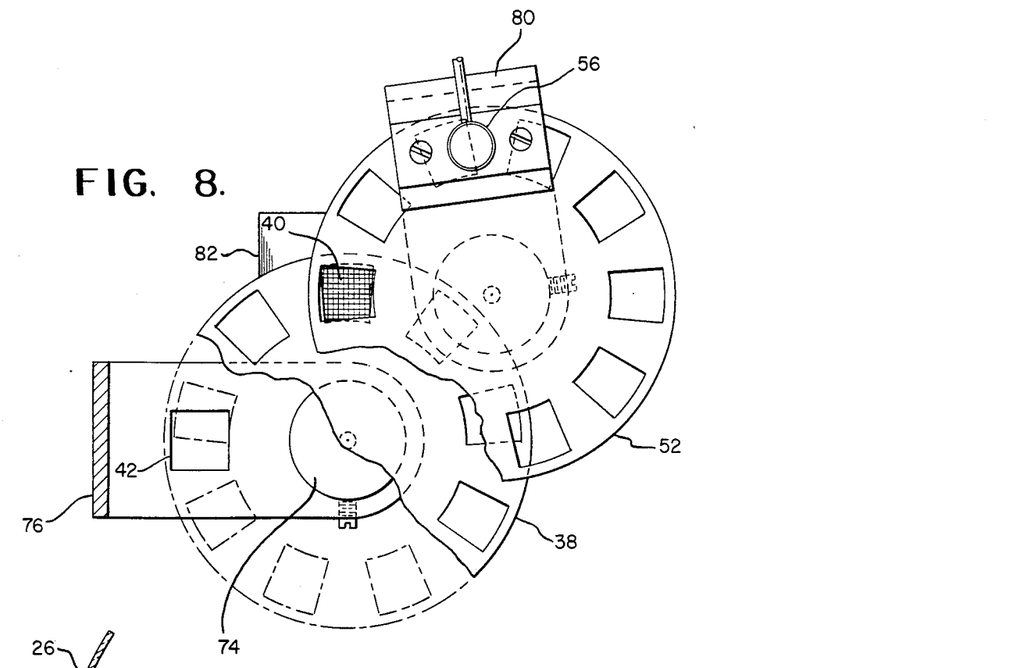
FIGURE 8 shows the mechanical mounting details of the detector unit.

While any desired mounting may be employed for the brackets 80, as illustrated in FIGURE 8, the brackets 76 and 80 are provided with a bore fitting over the housings of the motors 74 and 78 respectively. The brackets therefore may be rotated concentrically about the motor shafts and the respective discs to allow proper phasing. Set screws 76' and 80' are provided to lock the associated brackets in the desired positions.

For convenience, the motors 74 and 78 operate at a speed of 1800 revolutions per minute, and the disc 38 contains 9 perforations while the disc 52 contains 10 perforations. The reference voltage produced by cell 42 therefore has a frequency of 270 cycles per second, while the reference voltage from cell 54 has a frequency of 300 cycles per second.

Figure 5:
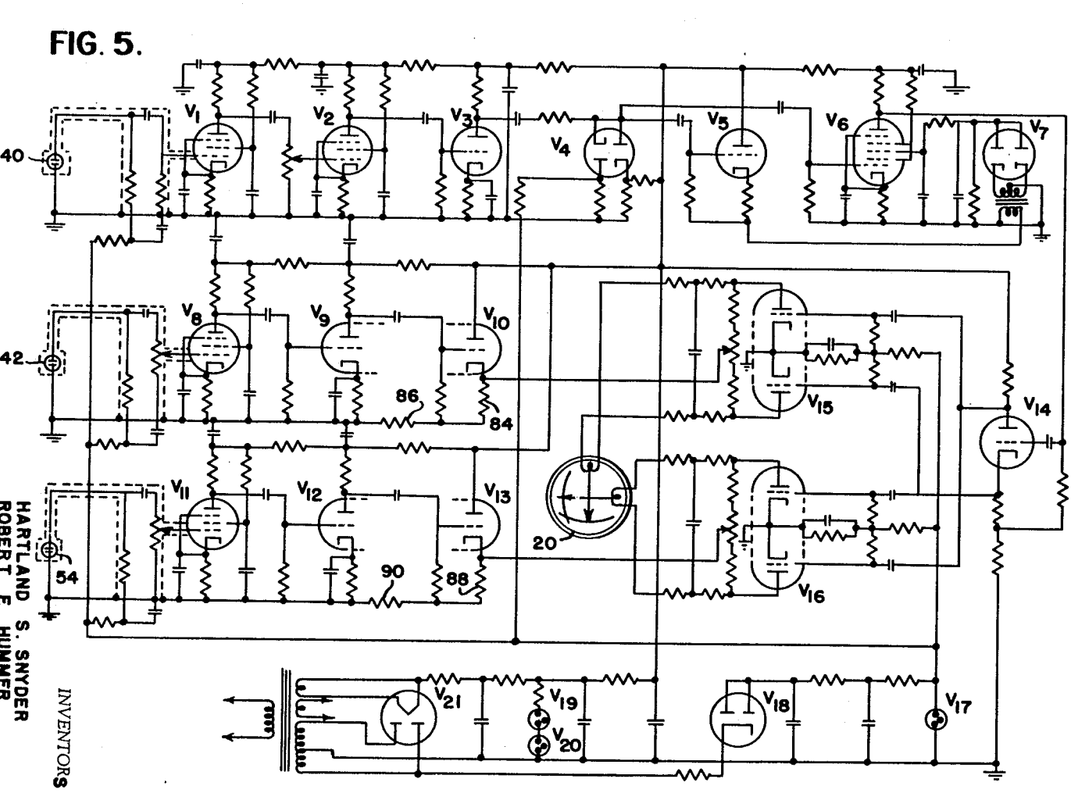
FIG. 5 is a schematic of the electronic circuits.
Figure 6:
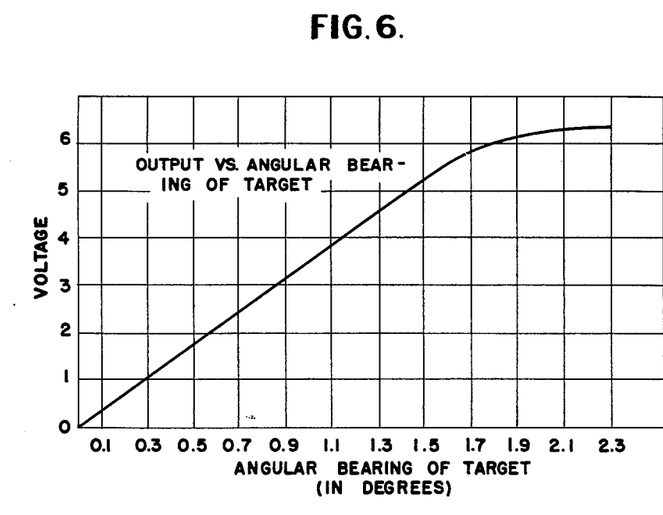
FIG. 6 shows a graph of Output vs. Angular Bearing of Target for the invention.

Turning now to the electronic circuits of FIG. 5 it will be found that this equipment consists of a high gain, wide bandpass amplifier for cell 40, two identical medium gain wide bandpass amplifiers for cells 42 and 54, two balanced demodulators, two low-pass filters, a power supply and a double movement microammeter for horizontal and vertical indication. The main amplifier, which is connected to cell 40 by means of a low capacitance coaxial cable, consists of a pentode-connected preamplifier ($V_1$), a stage of pentode amplification ($V_2$) followed by a triode stage ($V_3$), a double-diode clipper ($V_4$) limiting both positive and negative peaks of the signal swing, an automatic gain control circuit ($V_5$, $V_6$, $V_7$) and a phase inverter ($V_{14}$) to drive the grids of the demodulators ($V_{15}$, $V_{16}$).

The circuit constants of the automatic volume control or AVC tube ($V_6$) are so adjusted that this tube operates over the linear portion of its gain-versus-No. 3 grid characteristics. The combination of the AVC gain and the clipping level of $V_4$ holds the signal to a constant 6 volts R.M.S. at the grids of the demodulators independently of the input signal level, except for very weak signals.

In operation, the gain of the main amplifier is adjusted to a point where, with no flux on the cell, the sum of the cell noise and amplifier noise passes below the clipping level and is amplified by the full gain of the AVC tube to a final value of approximately 4 volts R.M.S. at the output of $V_{14}$. When sufficient flux reaches the cell to produce a signal level greater than noise, the AVC tube gain decreases, if the signal exceeds the clipping level, and the output remains at a 6 volt R.M.S. maximum. As the signal level from the cell increases, the AVC gain decreases thus decreasing the noise voltage at the output. This increases the signal-to-noise ratio at the output for constant signal.

Figure 7:
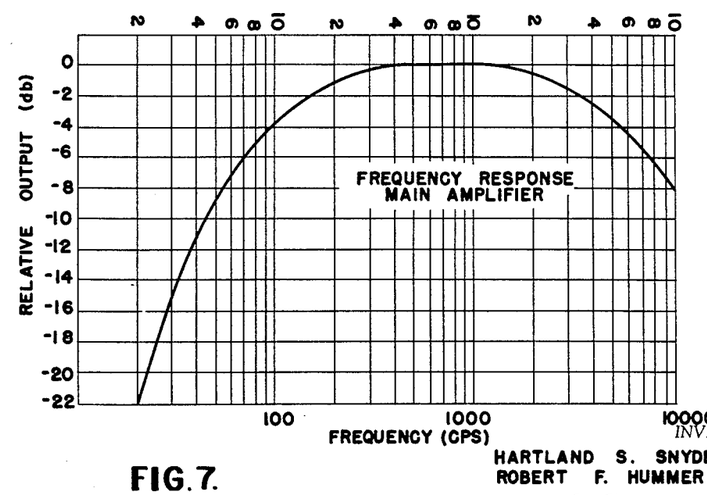
FIG. 7 shows a graph illustrating the frequency response of the main amplifier.

The overall gain of the main amplifier is 130 db with full AVC tube gain and 118 db with AVC tube gain equal to unity. The noise level referred to the input is approximately 1.8 microvolts without the cell and about 6.5 microvolts with the cell light-shielded. The amplifier has a pass-band 5000 cycles wide measured at half-power frequencies, as shown in FIG. 7.

The phase reference amplifiers are identical, each consisting of a pentode stage, a triode stage and a cathode follower, one of the amplifiers ($V_8$, $V_9$, $V_{10}$) being connected by a coaxial cable to cell 42 while the other amplifier ($V_{11}$, $V_{12}$, $V_{13}$) is connected to cell 54.

The horizontal and vertical demodulators ($V_{15}$ and $V_{16}$) shown in FIG. 5 are special forms of the well known square-law detector employing triodes. The term demodulation has been used throughout the specification to describe the final means by which the complex voltages from the main cell 40 and reference cells 42 and 54 are evaluated in terms of only the amplitude of each signal and the phase angle 50, the measure of the angular displacement of the thermal target from the optical line of sight 36. This process might more correctly be called one of modulation rather than demodulation since the complex reference voltage is impressed upon the complex signal voltage from the main cell 40 in such a manner that only the product of the amplitudes and the cosine of the phase angle 50 results as the indicating quantity at the meter 20. Since nonlinear circuit elements with square-law response serve equally well as modulators or demodulators, the term demodulation will again be used for the sake of uniformity.

Before discussing the actual demodulation scheme used in the present invention, it might be well to recall some general properties of square-law detectors. In such devices a varying signal is impressed upon the grid of the tube while at the same time a second varying signal is impressed in series with the direct voltage supply to the plate of the tube, the tube being biased to a point of near cut-off to produce considerable non-linearity. The result is that the instantaneous plate current of the tube can be expressed as a combination of linear, squared and product terms involving the two varying signals.

The important term, for the present application, is the product term. The linear terms of the demodulated signal are eliminated by a low-pass filter, but the squared terms, which have direct current components, cannot be removed by such a filter. However, these direct current components may be balanced out by a demodulation scheme wherein two triodes are operated in push-pull with their grids 180° out of phase. Each triode is connected to a common plate supply consisting of a varying voltage in series with the direct supply voltage and each grid is biased to cut-off so that at least a part of the grid swing covers the nonlinear foot of the plate current-grid voltage curve. Through the use of such a system, when the linear and square portions of the demodulated signal have been eliminated, there remains only the desired product of the two varying signals.

Referring now to the circuit of FIG. 5, it can be seen that tubes $V_{15}$ and $V_{16}$ are dual triodes which are connected as balanced demodulators. The first of the varying signals, which is derived from main cell 40, is amplified by the main amplifier ($V_1$, $V_2$, $V_3$), and applied through the paraphase stage $V_{14}$ to the grids of $V_{15}$ and $V_{16}$. The other varying signal is derived from reference cell 42, or 54, amplified by the reference amplifier ($V_8$, $V_9$, $V_{10}$) or ($V_{11}$, $V_{12}$, $V_{13}$), and applied to the plates of $V_{15}$ or $V_{16}$. It is to be noted that the quiescent plate current for $V_{15}$, flowing through the cathode resistors 84 and 86 of $V_{10}$, produces the direct current plate potential for the horizontal demodulator. The amplified signal voltage from the phase reference cell 42 also appears across the cathode resistors so that the cathode-ground potential is equivalent to the signal from reference cell 42 in series with the plate voltage of $V_{15}$. The same situation is present in the vertical reference demodulator when considering cathode resistors 88 and 90 and tube $V_{16}$.

As a further explanation of the operation of the balanced demodulators, it is pointed out that each portion of $V_{15}$, for example, conducts on alternate half-cycles of the signal from main cell 40, but since the signal from cell 40 and reference cell 42 have the same fundamental frequency, but differ in phase, each triode section will not conduct with the same plate curent. This unequal conduction of each half-cycle produces an unbalanced plate to plate voltage having the appearance of a full wave rectified signal whose polarity and amplitude are only functions of the amplitudes and phase angle of cells 40 and 42. As the phase angle 50 changes, the high side of the plate to plate voltage shifts from one tube to another causing a reversal in the direction of the unbalance current flowing through meter 20.

The undesired direct current component of the demodulated signal appearing as the plate current of $V_{15}$ or $V_{16}$, occurs alternately at the output of each portion of the tube on every half-cycle of the signal from cell 40 thus creating an unbalance voltage of the same frequency as that signal, but whose net effect at the meter is zero since the meter movement cannot respond to a rapidly alternating current.

It can also be shown why angle 48, the phase angle between the main cell signal and the reference signals, when angle 46 is zero (that is when the target is on the optical axis 36), was chosen equal to 90°. As the source of radiation signals moves off the axis 36, angle 48 and/or angle 58 becomes greater or less than 90° and the cosine of the angles goes — or + causing the zero-centered, mutually perpendicular pointers of meter 20 to indicate the angular deviation of the axis of the device from the target.

As has been pointed out previously, the indications given by the tracker of the present invention, are not intended to be limited to those given by a meter, such as 20, or the like. The horizontal and vertical deviations of a target from the optical axis, as given by the outputs of tubes $V_{15}$ and $V_{16}$, may just as well be applied to some form of follow-up system which may be employed to keep the tracker pointed at the remote target at all times.

From the above description of the present invention and the manner in which it operates, it is clear that there is disclosed a tracking device capable of locating and, if desired, of following a remote source of radiation. The apparatus is also capable of producing signals responsive to deviations of the source of radiation from a predetermined line of sight. Furthermore, there is disclosed a tracking apparatus possessing high sensitivity, high speed of response, and stability of operation while at the same time employing standard optics and only one receiving surface.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. In a tracking apparatus, means creating an image of a remote energy source at a reference plane, rotatable means to divide the image into segments, said rotatable means rotating about an axis perpendicular to the reference plane, a first radiation sensitive means for receiving the energy of the segments, a constant intensity source of radiation to be used as a reference signal, said rotatable means acting to also divide the radiation from the constant intensity source into segments, a second radiation sensitive means for receiving energy from the constant intensity source, amplifiers connected to each of the radiation sensitive means, a phase sensitive means connected to the amplifiers, and means responsive to the output of the phase sensitive means to indicate the deviation of said image from said axis.

2. In a tracking apparatus, means creating an image of a remote energy source at a reference plane, a plurality of rotatable means to divide the image into segments, each rotatable means rotating about an axis perpendicular to the reference plane, a first radiation sensitive means for receiving the energy of the segments, a constant intensity source of radiation associated with each of said rotatable means to be divided into segments thereby, another radiation sensitive means associated with each of the rotatable means, amplifiers connected to each of the radiation sensitive means, a plurality of phase sensitive means connected to the amplifiers, and means responsive to the outputs of the phase sensitive means to indicate the deviation of said image from said axis in more than one direction.

3. The apparatus of claim 2 wherein the rotatable means divide the image into segments at different frequencies.

4. The apparatus of claim 2 wherein the rotatable means divide the image into segments at different frequencies and the linear movement of one of said rotatable means is horizontal as it passes the first radiation sensitive means and the linear movement of another of said rotatable means is vertical as it passes the first radiation sensitive means.

5. In a tracking apparatus, means creating an image of a remote energy source at a reference plane, a radiation sensitive means, a reference source of radiation and another radiation sensitive means therefor, a sectored disk revolving about an axis normal to the reference plane, said disk dividing the image and the radiation from the reference source into segments, amplifiers for the outputs of the radiation sensitive means, demodulation means for determining the phase difference between the amplified outputs of the radiation sensitive means, deviations of said image from said axis causing variations in the phase difference, and means responsive to the output of the demodulation means to indicate the above-mentioned deviation.

6. The apparatus of claim 5 including a plurality of disks, a plurality of reference sources of radiation, a demodulation means for each of said disks, said demodulation means determining the phase difference relative to the reference sources caused by deviations of the image in more than one direction from said axis, and means responsive to the outputs of the demodulation means to indicate the directions of said deviations.

7. In an apparatus for causing a positionable device to remain directed toward a discontinuity in a radiant energy field, focusing means creating an image of the radiant field on a reference plane, an image of said discontinuity being centered on the focal axis when the device is directed toward the discontinuity in the energy field, a disc having a plurality of circumferentially-spaced openings arranged to receive said field and divide it into a plurality of portions, means producing relative rotation about said focal axis between said field and said disc, and radiation sensitive means in back of said disc in line with at least one of said portions having a modulated output with a phase sense responsive to the direction of deviation of said image from said axis.

8. In the combination of claim 7 means producing a reference output responsive to rotation of position of said rotating field, and means combining said reference output with said modulated output to produce output signals responsive respectively to direction and amount of said deviation.

9. The apparatus of claim 8 further including servomotor means connected to respond to the indications produced by said radiation sensitive devices to thereby position said positionable device to be directed toward the source of radiant energy.

10. In a tracking device, an optical means to establish a beam of radiant energy representative of the position of a moving remote object, a rotatable opaque disc having its plane crossing said beam, said disc having a plurality of circumferentially-spaced openings, means providing a second beam of radiant energy crossing the path of travel of said openings, radiation-sensitive means for each of said beams variably responsive to beam-intensity thereon, said disc being disposed so that said openings and the disc-portions therebetween serve as choppers for said beams.

11. In a tracking device, an optical means to establish a beam of radiant energy representative of the position of a moving remote object, a rotatable opaque disc having its plane crossing said beam, said disc having a plurality of circumferentially-spaced openings, means providing a second beam of radiant energy crossing the path of travel of said openings, radiation-sensitive means for each of said beams variably responsive to beam-intensity thereon, said disc being disposed so that said openings and the disc-portions therebetween serve as choppers for said beams, and means operable by said responsive means for providing an indication of the angle between said beams.

12. In a tracking device, an optical means to establish a beam of radiant energy representative of the position of a moving remote object, a pair of rotatable discs having planes crossing said beam and substantially parallel axes, each of said discs having openings spaced along annular portions thereof, certain of said portions on said discs being in overlapping relation, radiation sensitive means in line with said overlapping portions and adapted to receive said beam when said openings are traversed thereby, whereby to provide signals representative of the position of said object, means providing phase-reference signals for each of said discs, and indicator means connected to said sensitive means and phase-reference means and responsive to the deviation of the first said signals from the reference signals.

13. In a tracking device, a pair of overlapping rotatable discs, means for rotating said discs, means to provide a beam of radiant energy representative of the position of a moving object, means for directing said beam in a direction for passing through said discs, said discs having overlapping portions passing said beam, constant reference beams directed toward said discs, and radiation-sensitive means responsive to the intensities of said beams passing through said discs, and modulation indicator means connected to said responsive means for indication deviation of the first said beam from the reference beams.

References Cited in the file of this patent

UNITED STATES PATENTS

| | | |
|---|---|---|
| 2,369,622 | Toulon | Feb. 13, 1945 |
| 2,462,925 | Varian | Mar. 1, 1949 |

FOREIGN PATENTS

| | | |
|---|---|---|
| 33,746 | Netherlands | Oct. 15, 1934 |

OTHER REFERENCES

Photoelectric Guiding of Astronomical Telescopes, by Whitford and Kron, published in Review of Scientific Instruments, March 1937, vol. 8, pages 78–82.